United States Patent [19]

Krikorian

[11] 3,963,921

[45] June 15, 1976

[54] METHOD FOR PRODUCING URANIUM ATOMIC BEAM SOURCE

[75] Inventor: Oscar H. Krikorian, Danville, Calif.

[73] Assignee: The United States of America as represented by the United States Energy Research and Development Administration, Washington, D.C.

[22] Filed: Apr. 16, 1974

[21] Appl. No.: 462,016

[52] U.S. Cl. .................................... 250/251; 55/17; 75/122.7; 423/254; 250/282

[51] Int. Cl.$^2$ .................... G01N 27/78; B01D 57/00

[58] Field of Search ........... 250/251, 282, 288, 425; 55/17; 423/254; 75/122.7

[56] References Cited

UNITED STATES PATENTS

| | | | |
|---|---|---|---|
| 2,914,433 | 11/1959 | McGeary et al. | 423/254 |
| 3,558,877 | 1/1971 | Pressman | 55/17 |
| 3,600,585 | 8/1971 | Kelly | 75/122.7 |
| 3,772,519 | 11/1973 | Levy | 250/288 |

*Primary Examiner*—Maynad R. Wilbur
*Assistant Examiner*—S. C. Buczinski
*Attorney, Agent, or Firm*—Dean E. Carlson; F. A. Robertson; L. E. Carnahan

[57] ABSTRACT

A method for producing a beam of neutral uranium atoms is obtained by vaporizing uranium from a compound $UM_x$ heated to produce U vapor from an M boat or from some other suitable refractory container such as a tungsten boat, where M is a metal whose vapor pressure is negligible compared to that of uranium at the vaporization temperature. The compound, for example, may be the uranium-rhenium compound, $URe_2$. An evaporation rate in excess of about 10 times that of conventional uranium beam sources is produced.

7 Claims, No Drawings

METHOD FOR PRODUCING URANIUM ATOMIC BEAM SOURCE

The invention described herein was made in the course of, or under, Contract No. W-7405-ENG-48, with the U.S. Atomic Energy Commission.

BACKGROUND OF THE INVENTION

This invention relates to isotopic separation processes for uranium, and more particular to a method for producing a beam of neutral uranium atoms by vaporizing uranium from a uranium containing compound.

The separation of the isotope $U^{235}$ (which is fissionable by neutrons) from natural uranium, a binary mixture containing mainly non-fissionable $U^{238}$, or simply the enrichment of the mixture in $U^{235}$ are extremely important processes for nuclear applications. The process now used on an industrial scale is the separation by diffusion through a porous barrier, although a number of other processes have been used or suggested including electromagnetic separation (the so-called "calutron" separation), separation by centrifugation, and by thermal diffusion.

More recently isotopic separation by laser has been proposed wherein uranium vapor is irradiated by laser light to preferentially excite the $U^{235}$ isotope, as exemplified by U.S. Pats. No. 3,443,087, issued May 6, 1969 and No. 3,558,877, issued Jan. 26, 1971, and by French Patent No. 2,094,967 published Apr. 2, 1972.

Isotopic separation by laser light requires a source of neutral uranium atoms "intense" enough to provide a uranium vapor pressure of about $10^{-2}$ torr for periods of several hours. Conventional beam sources, in which uranium metal is resistively heated in a tungsten boat, are not practical for this purpose since molten uranium is highly corrosive to tungsten. At 2000°K, where the uranium vapor pressure is barely adequate, a tungsten boat will last only a few minutes. Arc-melting and electron-beam melting are not desirable because these methods create uranium atoms in an excited state rather than the required neutral atoms. Also, a prior known process for producing a beam of neutral uranium atoms, described in J. Chem. Phys., Sept. 1, 1972, page 1975, involved an atom beam source in which uranium metal is vaporized from a tungsten filament.

SUMMARY OF THE INVENTION

The present invention is directed to a process for producing a uranium atomic beam source by vaporizing uranium from a $UM_x$ compound contained in an M boat, such as $URe_2$ contained in a rhenium boat, or by vaporizing uranium from a $UM_x$ compound, such as $URe_2$, contained in a tungsten boat. The invention produces uranium atomic beams of the required "intensity" and duration for use in laser isotope separation processes.

Therefore, it is an object of this invention to provide a method for producing a uranium atomic beam source.

A further object of the invention is to provide a method for producing a beam of neutral uranium atoms by vaporizing uranium from a uranium compound, such as uranium-rhenium, the compound being contained in a corresponding type metal boat or contained in a tungsten boat, or in some other suitable refractory container.

Other objects of the invention will become apparent from the following description.

DESCRIPTION OF THE INVENTION

This invention involves a method for producing uranium atomic beams of the required intensity and duration for use in isotope separation processes in which uranium vapor having a pressure of about $10^{-2}$ torr is irradiated by laser light to preferentially excite the $U^{235}$ isotope. The method broadly consists of vaporizing uranium from a uranium-bearing compound ($UM_x$) where M is a metal whose vapor pressure is negligible compared to that of uranium at the vaporization temperature, the compound being in an M boat or contained in tungsten boats. Possible choices for M are rhenium, osmium, iridium, and niobium (niobium forms a solid solution with uranium). While the following description of examples and operational sequences is directed to rhenium as the metal M in a uranium-rhenium compound $URe_2$ in a rhenium boat or coated on tungsten filaments, it is not intended to limit the invention to this specific compound. The invention will be described first using the $URe_2$ compound in a rhenium boat, followed by a description of $URe_2$ coated tungsten filaments.

The method consists simply of vaporizing uranium from the uranium-rhenium compound $URe_2$ from a rhenium boat. At a typical operating temperature of 2300°K, the vapor in equilibrium with $URe_2$ consists almost entirely of uranium atoms rather than $URe_2$ molecules. The known vapor pressure of rhenium, $10^{-7}$ torr, is sufficiently low at this temperature that vaporization of rhenium from the boat itself is minimal. Furthermore, the melting points of pure rhenium, 3453°K, and of the Re-$URe_2$ eutectic, 2380°K, are sufficiently high as to suitably contain that compound. Details for carrying out an example of the method and results of such are as follows

EXAMPLE

Chips of uranium metal were arc-melted with a stoichiometric excess of rhenium powder (to preclude free uranium in the product) to form $URe_2$. 0.36 gram of powdered $URe_2$ was placed in a 0.1 mm thick rhenium (Re) boat located in a vacuum chamber and resistively heated by passing a current of 100 amps at 3.4 volts through the boat. Operating pressure of the vacuum chamber was $10^{-6}$ torr, and evaporation temperature (as determined by optical pyrometer corrected for window-attenuation) was 2300°K. After operation for more than one hour, the vacuum chamber was cooled and the rhenium boat plus $URe_2$ charge was weighed. The $URe_2$ weight loss corresponded to an average evaporation rate of 50 mg/cm$^2$-hr based upon a boat evaporation area of 0.4 cm$^2$. This evaporation rate is about ten times faster than conventional uranium beam sources using tungsten boats. There was no observable corrosion of the rhenium boat.

As thus shown, in its broadest aspect, the above described method involves a source which is capable of producing a uranium atomic beam in which a compound $UM_x$ is heated to produce U vapor from a M boat, with M being, as pointed out above, osmium, iridium and niobium, as well as rhenium. In the U-Re system, $URe_2$ is the only compound that exists in equilibrium with Re metal itself, and a high eutectic temperature (2380°K) exists between Re and $URe_2$; also, Re and $URe_2$ have low mutual solubities. This permits the use of an Re boat to contain the $URe_2$, with negligible corrosion.

The method for utilizing a $UM_x$ compound contained in a tungsten boat rather than in an M boat is as follows

EXAMPLES

A tungsten boat resistive heater, 0.25 mm thick, with a hot zone 9 mm wide by 40 mm long, and having a 1 mm depression for sample containment, was loaded with 0.59 g of coarse $URe_2$ powder which was spread out over ~ 0.6 $cm^2$ of boat area. The sample was heated under ~ $10^{-6}$ torr vacuum for 23 min. at ~2170°C as observed in the hottest part (the center) of the heater. The central portion, containing ~ one third of the sample was observed (through an optical pyrometer) to melt, and to remain molten throughout the run. The weight change of the sample gave an average weight loss rate of ~ 50 $mg/cm^2$-hr, and a metallographic cross section of the molten region showed negligible attack of the tungsten boat although the melt had wet and spread slightly on the tungsten surface. This run demonstrated the good corrosion resistance of tungsten to solid or molten $URe_2$, and showed how $URe_2$ may be applied as a coating to tungsten surfaces to fabricate filament vapor sources.

Subsequent work has now shown that a corrosion resistant barrier of ~ 25 $\mu$m thickness forms on tungsten surfaces in contact with molten $URe_2$. These experiments were conducted at temperatures above the melting point of $URe_2$ (2170°C), this being due to the higher operating temperature possible with a tungsten boat without significant corrosion of the tungsten by molten uranium rhenide or uranium vapor. Corrosion of tungsten by both molten $URe_2$ and uranium vapor has been shown to be negligible in heatings up to temperatures as high as 2600°K for more than one hour, where the uranium vapor pressure at 2550°K is found by rate of weight loss and mass spectrometry to be 0.010 torr within the heater chamber, and 0.005 torr (corresponding to 320 $mg/cm^2$-hr) at the orifice of the chamber. Mass spectrometric analyses of the effusing vapor at 2100°–2600°K has also established that atomic uranium represents more than 90% of the uranium containing vapor constituents.

It has thus been shown that the present invention provides a uranium atomic beam source, and particularly a method for producing a beam of neutral uranium atoms by vaporizing uranium from a uranium bearing compound such as $URe_2$ contained in an appropriate boat of similar metal or coated on a tungsten filament, or contained in a tungsten boat, thereby providing an evaporation rate in excess of about ten times that of conventional uranium beam sources.

While particular examples and operational sequences for carrying out the invention have been described, modifications and changes will become apparent to those skilled in the art, and it is intended to cover in the appended claims all such modifications and changes as come within the spirit and scope of the invention.

What I claim is:

1. A method for producing a beam of neutral uranium atoms comprising the step of vaporizing uranium from a uranium-bearing compound composed essentially of uranium and a metal M whose vapor pressure is negligible compared to the vapor pressure of uranium at vaporization temperature and selected from the group consisting of rhenium, osmium, iridium, and niobium.

2. The method defined in claim 1, wherein the step of vaporizing the compound is carried out by placing a quantity of the compound in a boat of the metal M, and heating the boat.

3. The method defined in claim 1, wherein the step of vaporizing the compound is carried out by containing the compound in a tungsten boat, and heating the compound.

4. The method defined in claim 1 wherein the compound is $URe_2$ .

5. The method defined in claim 4, wherein the step of forming the $URe_2$ compound is accomplished by arc-melting chips of uranium metal with a stoichiometric excess of rhenium powder.

6. The method defined in claim 4, wherein the step of vaporizing the $URe_2$ compound is carried out by placing a selected quantity of powdered $URe_2$ in a rhenium boat of selected thickness, placing the boat in a vacuum chamber, and resistively heating the $URe_2$ by passing electric current through the boat causing vaporization of the uranium from the $URe_2$ compound.

7. The method defined in claim 4, wherein the step of vaporizing the $URe_2$ compound is carried out by containing the compound in a tungsten boat, placing the tungsten boat in a vacuum chamber, and resistively heating the $URe_2$ by passing electric current through the tungsten boat causing vaporization of the uranium from the $URe_2$ compound.

* * * * *